Patented Nov. 1, 1927.

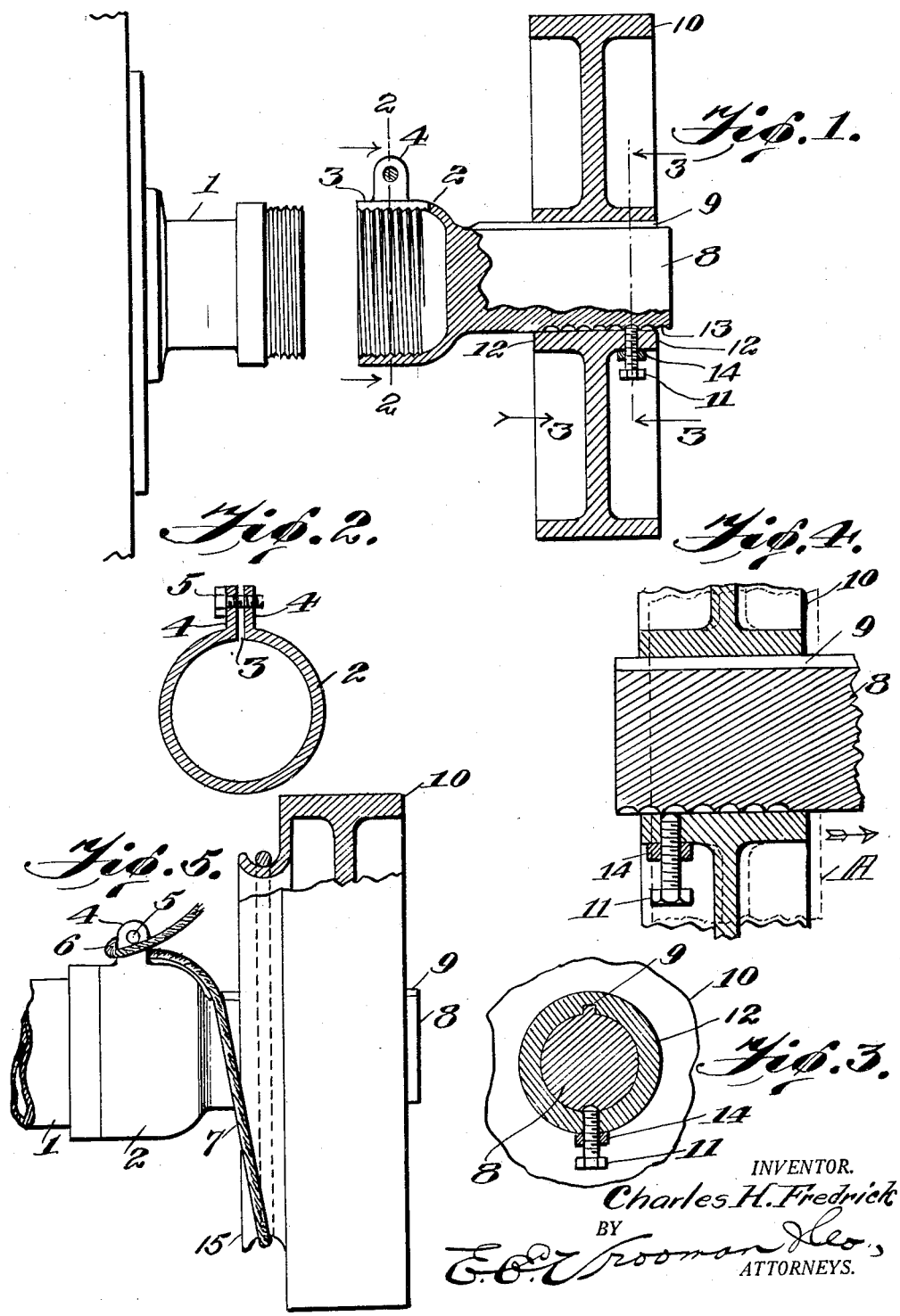

1,647,789

UNITED STATES PATENT OFFICE.

CHARLES H. FREDRICK, OF SPRINGFIELD, MISSOURI.

PULLEY-ATTACHING HUB CAP.

Application filed October 5, 1926. Serial No. 139,746.

This invention relates to a pulley-attaching hub-cap, and the object of the invention is the provision of simple and efficient means for attaching a pulley to the hub of the wheel of preferably a motor vehicle, whereby power may be transmitted for such purposes as operating machinery of different kinds, or for removing an automobile from a mired position in the roadway.

Another object of the invention is the construction of a hub-cap device which can be easily attached to the hub of a wheel, or after being attached can be quickly detached and disassembled for storing away in a suitable place.

With the foregoing and other objects in view, my invention comprises certain novel constructions, combinations and arrangements of parts as will be hereinafter fully described, illustrated in the accompanying drawings, and more particularly pointed out in the appended claims.

In the drawings:

Figure 1 is a longitudinal sectional view of a device constructed in accordance with the present invention, contiguous to a hub of a motor vehicle wheel.

Figure 2 is a sectional view taken on line 2—2, Figure 1 and looking in the direction of the arrows.

Figure 3 is a sectional view taken on line 3—3, Figure 1 and looking in the direction of the arrows.

Figure 4 is an enlarged fragmentary sectional view of the device.

Figure 5 is a view partly in section and partly in elevation of another embodiment of the present invention.

Referring to the drawings by numerals, 1 designates the hub of a wheel of a motor vehicle upon which my hub-cap device is adapted to be screwed for attaching the same to said hub 1.

My pulley-attaching hub-cap device comprises an internally threaded split cap 2, which is provided contiguous to the split or slit 3 with a pair of parallel apertured ears 4. These outwardly extending ears 4 can be clamped together by means of a threaded member, such as bolt 5 for more tightly securing the cap upon hub 1 after it has been screwed into place. These ears 4 constitute an admirable means for wrapping a "half-hitch" 6 (Fig. 5) of the rope or cable 7 around same for the purpose hereinafter described.

Integral with split cap 2 and extending outwardly therefrom is stub axle 8. This stub axle is preferably provided with a spline 9 that assists in efficiently retaining the pulley or belt wheel 10 upon said stub shaft 8. A set screw 11 is screwed through the hub 12 of pulley or wheel 10 and its inner end is adapted to ride into the sockets 13 for crowding the pulley or belt wheel inwardly upon stub shaft 8 and securely holding said pulley or belt wheel in position upon said stub axle. In Figure 4, I have shown by dotted line A how the pulley or belt wheel 10 is more tightly forced inwardly upon the stub axle as the set screw 11 is screwed tightly into position. If the inner end of screw 11 at first contacts with the hightest point of the socketed portion, it will as a result of its inward screwing action, ride down at its inner end into the socket, which more tightly forces the pulley or belt wheel upon the stub shaft. A lock nut 14 is on set-screw 11 for locking the screw in position after it has been tightly screwed against the stub shaft 8.

By placing an ordinary belt upon pulley or belt wheel 10, after the device has been attached to the "power" wheel from which hub 1 extends, the operator can transmit power to the desired machine, or for the desired purpose.

In Figure 5, I have shown the pulley or belt wheel 10 provided with an integral drum 15, so that not only may the device be used for transmitting power by means of a belt, but if a party gets stuck in the mud, he can place a half-hitch 6 around the ears 4 and then wrap the rope or cable 7 around the drum 15, thence extend the rope or cable to a stake or tree (not shown) along the roadside, and by starting the motor, the cable 7 will be wound upon the drum 15, pulling the automobile out of the mud under its own power. This is very efficient and valuable to tourists, who might frequently need the assistance of such a device as mine.

When my device is not in use, it can be quickly detached from the hub of the wheel and stored away. It is understood that by loosening the set-screw 11, the pulley or belt wheel 10 can be easily removed from the stub shaft 8, allowing the two units to be stored away in a more compact position.

While I have described the preferred embodiments of my invention and illustrated the same in the accompanying drawings, certain minor changes or alterations may appear to a person skilled in the art to which this invention relates, during the extensive manufacture of the same, and I, therefore, reserve the right to make such alterations or changes as shall fairly fall within the scope of the appended claims.

What I claim is:

1. In a device of the class described, the combination of a cap provided with an outstanding ear and with an integral centrally-positioned end stub-shaft, a belt wheel on said stub-shaft, and said belt wheel provided on its side contiguous to said ear with a drum for receiving a rope or cable adapted to be wrapped around or anchored upon said ear.

2. In a device of the class described, the combination of an internally threaded split cap, said cap provided at its split portion with a pair of outwardly extending apertured ears, a bolt screwed through said ears, said cap provided with an integral outwardly extending stub-shaft, said stub-shaft provided with a longitudinally extending spline and with a row of sockets, a belt wheel on said stub-shaft over said spline and sockets, and a set-screw on said belt wheel and having its inner end seated in a socket, substantially as shown and described.

In testimony whereof I hereunto affix my signature.

CHARLES H. FREDRICK.